(12) United States Patent
Cooke

(10) Patent No.: US 9,408,459 B2
(45) Date of Patent: Aug. 9, 2016

(54) COMBINATION BROOM AND SHOVEL

(71) Applicant: Reid Cooke, Cleveland, NC (US)

(72) Inventor: Reid Cooke, Cleveland, NC (US)

( * ) Notice: Subject to any disclaimer, the term of this patent is extended or adjusted under 35 U.S.C. 154(b) by 0 days.

(21) Appl. No.: 14/799,754

(22) Filed: Jul. 15, 2015

(65) Prior Publication Data

US 2016/0021810 A1  Jan. 28, 2016

Related U.S. Application Data

(60) Provisional application No. 62/027,839, filed on Jul. 23, 2014.

(51) Int. Cl.
| | |
|---|---|
| *A01B 1/20* | (2006.01) |
| *A01B 1/22* | (2006.01) |
| *A01D 9/00* | (2006.01) |
| *A01D 11/00* | (2006.01) |
| *A46B 15/00* | (2006.01) |
| *A01B 1/02* | (2006.01) |

(52) U.S. Cl.
CPC .............. *A46B 15/0055* (2013.01); *A01B 1/20* (2013.01); *A01B 1/02* (2013.01)

(58) Field of Classification Search
CPC .......... A01B 1/026; A01B 1/022; A01B 1/20; A01B 15/0055; A01B 1/02; B25G 3/02; B25G 1/04; E01H 5/02; B25F 5/026; E05B 1/0015; A46B 15/0055

USPC .............. 294/54.5, 57–58; 16/426–427, 429, 16/438; 37/265, 285; D8/10
See application file for complete search history.

(56) References Cited

U.S. PATENT DOCUMENTS

| | | | | |
|---|---|---|---|---|
| D355,075 S | * | 2/1995 | Stone | D30/162 |
| 6,170,112 B1 | * | 1/2001 | Mayfield | A46B 17/02 |
| | | | | 15/143.1 |
| D444,952 S | * | 7/2001 | Mason, Jr. | D4/118 |
| 6,944,980 B1 | * | 9/2005 | Lefrancois | E01H 5/02 |
| | | | | 37/285 |
| D553,921 S | * | 10/2007 | Melady | D8/10 |
| 7,347,468 B1 | * | 3/2008 | Tidcomb | A01B 1/022 |
| | | | | 15/117 |
| D617,158 S | * | 6/2010 | Smith | D8/10 |
| 2005/0017525 A1 | * | 1/2005 | Douziech | E01H 5/02 |
| | | | | 294/58 |

* cited by examiner

*Primary Examiner* — Stephen Vu

(74) *Attorney, Agent, or Firm* — Shumaker, Loop & Kendrick, LLP

(57) ABSTRACT

The invention is a combination broom and shovel having an extended handle, a shovel head and a broom head attached to the same end of the device. The shovel head has a bed and a leading edge that is flat and at a slight angle relative to an axis of the extended handle. The broom head has a leading edge that is flat and at an angle that is roughly perpendicular to the bed of the shovel head.

5 Claims, 5 Drawing Sheets

COMBINATION BROOM AND SHOVEL

TECHNICAL FIELD AND BACKGROUND OF THE INVENTION

The present invention relates generally to the field of material handling and more particularly to the field of material and debris collection.

Certainly the art of shovels and shoveling is quite old as is the art of brooms and sweeping. Shovels come in a variety of shapes and sizes. They have a variety of handle options and may be constructed from a variety of materials. However, one uniform aspect of a shovel is a leading front edge. Though the leading edge may be curved (as with a spade shovel), for a variety of reasons, many shovels include a flat front edge. Shovels used to remove debris from an area may have such a uniformly flat front leading edge. Such a flat shovel may be useful for shoveling and moving debris from a substantially flat surface. However, as such shoveling is performed, inevitably residual debris may remain on the surface. The person performing the shoveling must then utilize another method and/or device to collect and remove the residual debris. Thus, there is a long felt need in the art for a device that enables the person performing the shoveling to collect and remove the residual debris efficiently and without resort to a different device.

Like shovels, the art of brooms is old and like shovels, though broom construction may vary from broom to broom, a uniform aspect of the broom is a leading sweeping edge. Though the sweeping edge may include an angle, it is almost uniformly of a straight edge defined by a multitude of linear straws, fibers, and the like. Typically a broom may be utilized for sweeping debris into a pile. Once in a pile, the debris may then be collected. A person performing a sweeping operation may use a dust pan, flat shovel, and the like for collection. However, the separate collector, be it a dust pan, shovel, or similar device must necessarily be placed aside while the sweeping is being performed. Thus, the sweeper must stop sweeping and separately obtain the secondary utensil in order to collect the debris. Thus, there is a long felt need in the art for a debris collection device which affords a sweeper the ability to both sweep and collect with the same device.

Similarly, when a sweeper is sweeping a large area or an area having significant quantities of debris or especially bulky debris, it is common in the art for the debris to become too bulky to sweep. In such cases, even a large push broom may not be effective to remove debris. In such a case, a sweeper mush first shovel and then sweep the area clear of debris. Thus, there is a long felt need in the art for a device which affords a sweeper the ability to sweep large amounts of debris and/or bulky debris in an effective manner with a single tool.

SUMMARY OF THE INVENTION

It therefore is an object of the present invention to provide a device that enables the person performing a shoveling operation to collect and remove any residual debris efficiently and without resort to a different device. It is an object of the present invention to provide a device which affords a sweeper the ability to both sweep and collect with the same device. It is a further object of the present invention to provide a device which affords a sweeper the ability to sweep large amounts of debris and/or bulky debris in an effective manner with a single tool.

These and other objects and advantages of the invention are achieved by providing a combination broom and shovel having an extended handle, a shovel head attached to the handle, and a broom head also attached to the handle. The handle has one handle end for holding of the device by a user. Both the shovel head and the broom head are preferably attached to a second end opposite the handle end.

According to an embodiment of the invention, the shovel has a leading edge that is preferably flat and at a slight angle relative to the axis of the handle. A bed of the shovel extends in a plane from the leading edge of the shovel head toward the handle. The bed of the shovel is further defined by left, right, and rear edges of the shovel head with the rear edge forming a connection the handle.

According to another embodiment of the invention, the broom head has a leading edge and is preferably flat and at an angle that is roughly perpendicular to the bed of the shovel. The broom head has a multitude of bristles which are attached to the handle.

According to another embodiment of the invention, the bristles of the broom head may be attached to the handle via connection bar.

According to another embodiment of the invention, the bristles are in the form of a push broom that has an elongate head.

According to another embodiment of the invention, the elongate head of the broom head is three times as wide as the bed of the shovel.

According to another embodiment of the invention, the elongate head of the broom head is twice as wide as the bed of the shovel.

According to another embodiment of the invention, the elongate head of the broom head is the same width as the bed of the shovel.

According to a method of using the invention, a user sweeps debris in a pushing motion with both the head of the broom and the head of the shovel in contact with a horizontal surface at the same time.

According to another method of using the invention, a user shovels debris and then flips the device over to sweep the debris into a pile. The user may repeat the step of shoveling and then sweeping.

According to another method of using the invention, a user sweeps debris into a pile and then flips the device over to shovel or scoop the debris so as to transport to another location.

BRIEF DESCRIPTIONS OF THE DRAWING FIGURES

The present invention is best understood when the following detailed description of the invention is read with reference to the accompanying drawings in which.

DETAILED DESCRIPTION OF THE PREFERRED EMBODIMENT

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Figure 1:
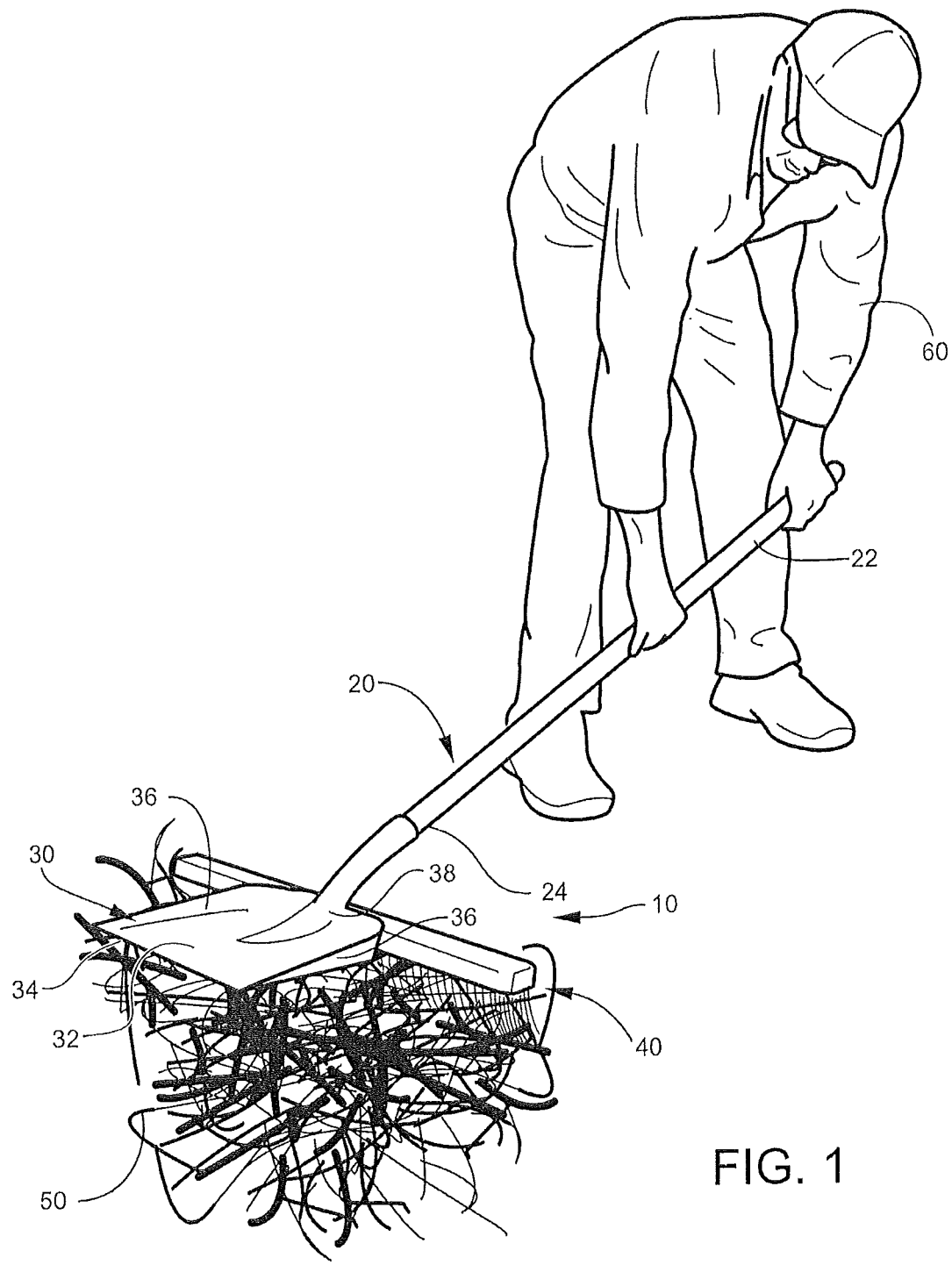
FIG. 1 is a perspective environmental view of one embodiment of the invention.
Figure 2:
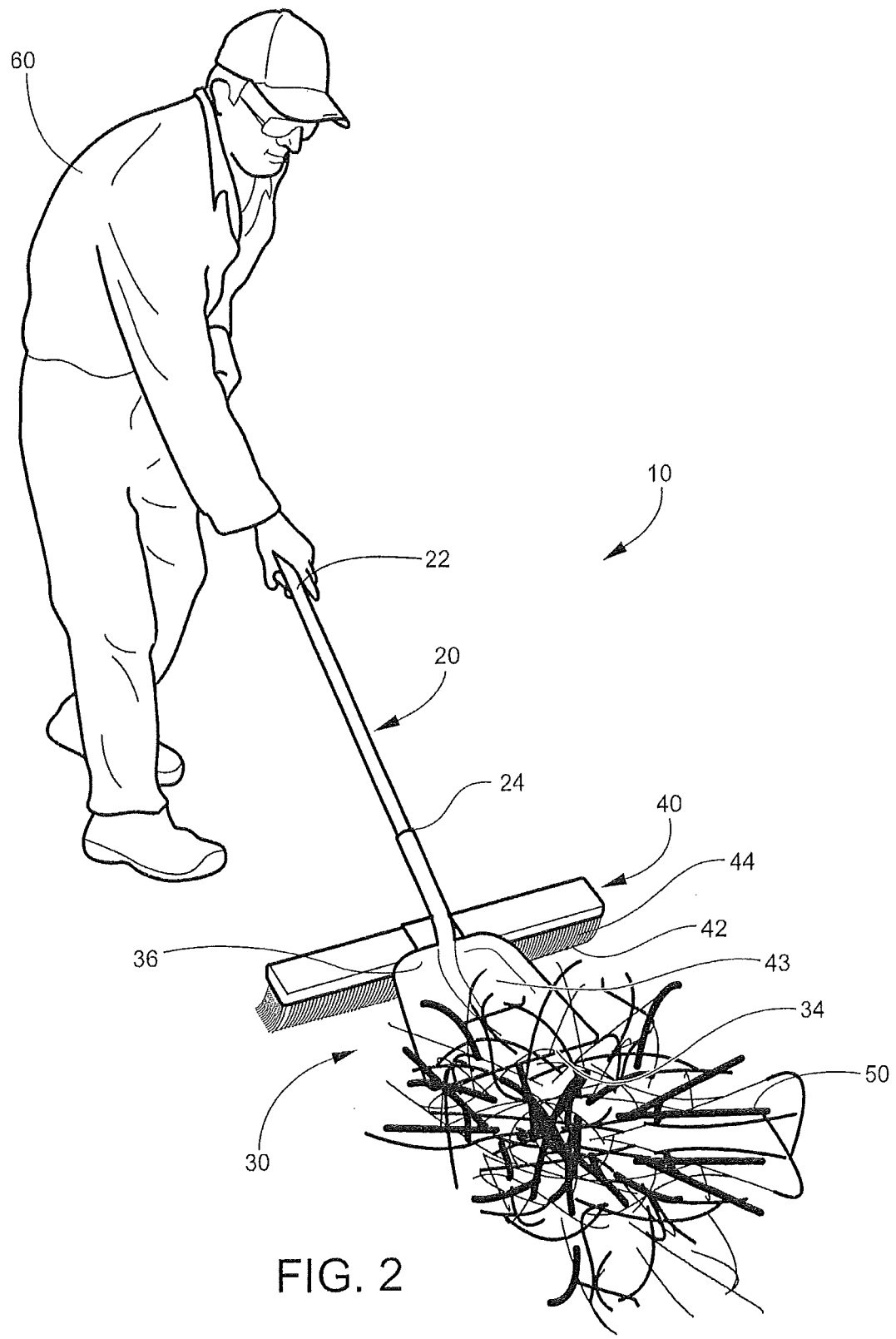
FIG. 2 is a perspective environmental view of one embodiment of the invention.

Referring to FIGS. 1-5, a combination broom and shovel 10 is shown. In FIGS. 1-2, a user 60 is shown holding the extended handle 20 at a handle end 22. The user is sweeping and shoveling a pile of debris 50. The shovel portion 30 and the broom portion 40 attach to the extended handle 20 at an opposite end 24 from the handle end 22 of the extended handle 20.

The shovel portion 30 has a bed 32 terminating in a leading edge 34 used for shoveling. The leading edge 34 is flanked by left and right edges, 36 which connect to a rear edge 38. The rear edge 38 forms a connection the extended handle 20 at an end opposite end 24 from the handle end 22.

The broom portion 40 has a leading edge 42 formed by a multitude of bristles 44. The broom portion 40 is likewise attached the extended handle 20 at an end of the extended handle 20 that is opposite 24 the handle end 22.

Figure 4:
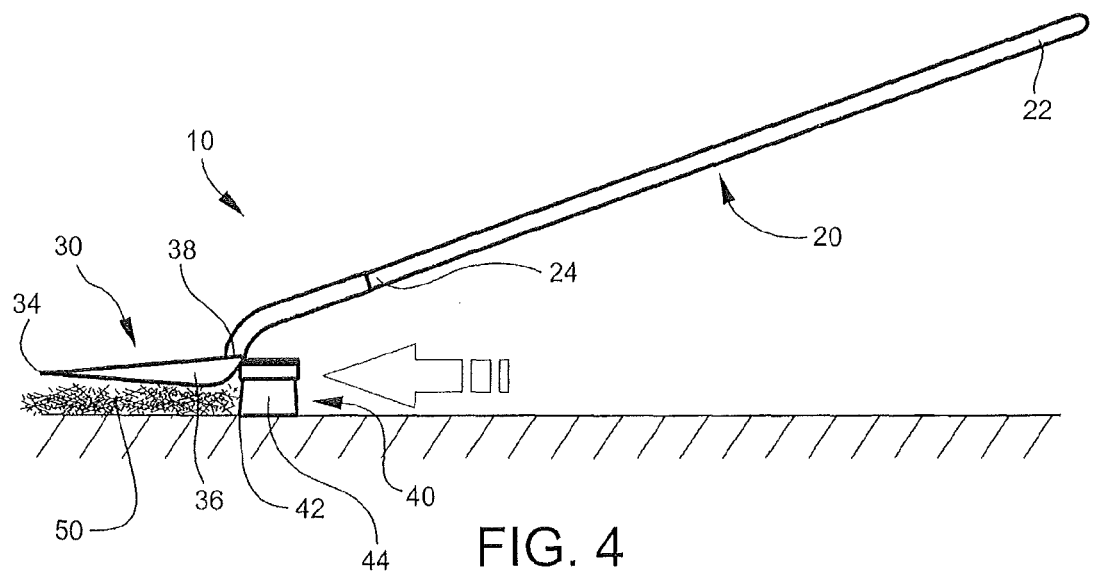
FIG. 4 is a side view of one embodiment of the invention.

As best shown in FIGS. 1 and 4, the broom portion 40 may be utilized to sweep a pile of debris 50. The broom portion 40 may also be used to collect a pile of debris 50. Used in these ways, the leading edge 42 of the broom portion 40 contacts the debris 50 while the remaining bristles 44 support the leading edge and contact the horizontal ground or floor. As best shown in FIG. 4, when the broom portion 40 is used in these ways, the extended handle 20 is at a first angle with the horizontal.

Figure 5:
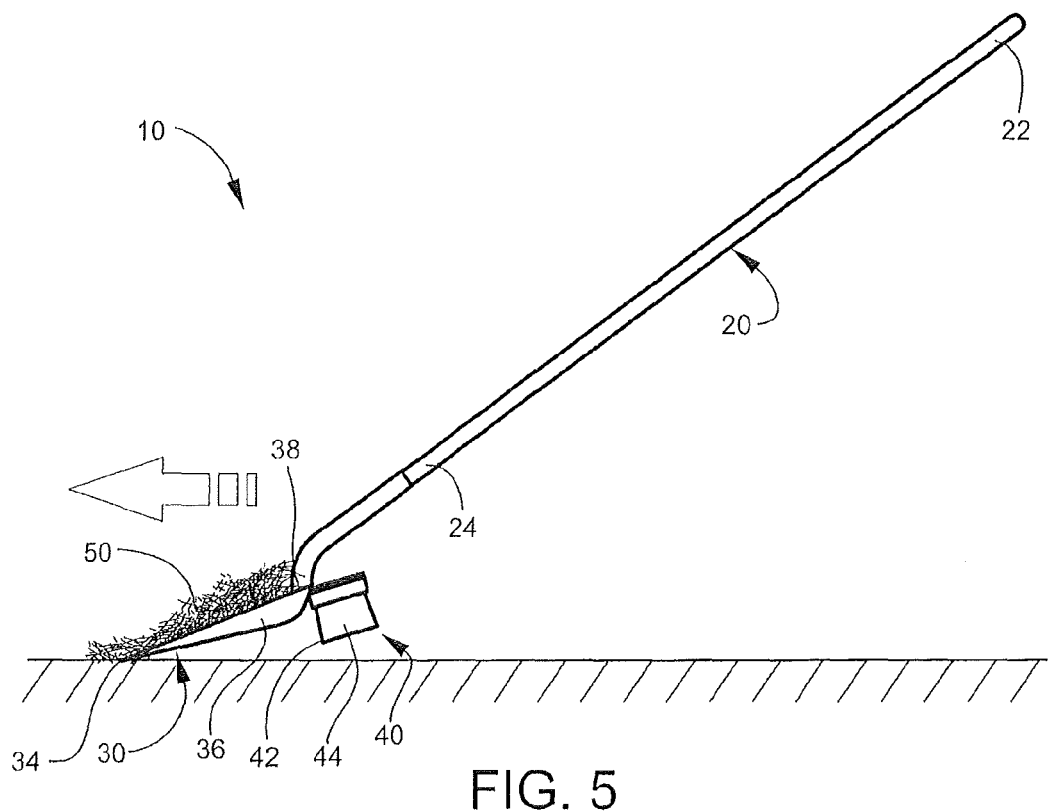
FIG. 5 is a side view of one embodiment of the invention.

As best shown in FIGS. 2 and 5, the shovel portion 30 may be utilized to scoop or to shovel pile of debris 50. Used in this way, the leading edge 34 of the shovel portion 30 initially contacts the debris 50. As the shoveling is commenced, the debris then contacts the bed 36 of shovel portion 30. As best shown in FIG. 5, when the shovel portion 30 is used in these ways, the extended handle 20 is at a second angle with the horizontal.

Figure 3:
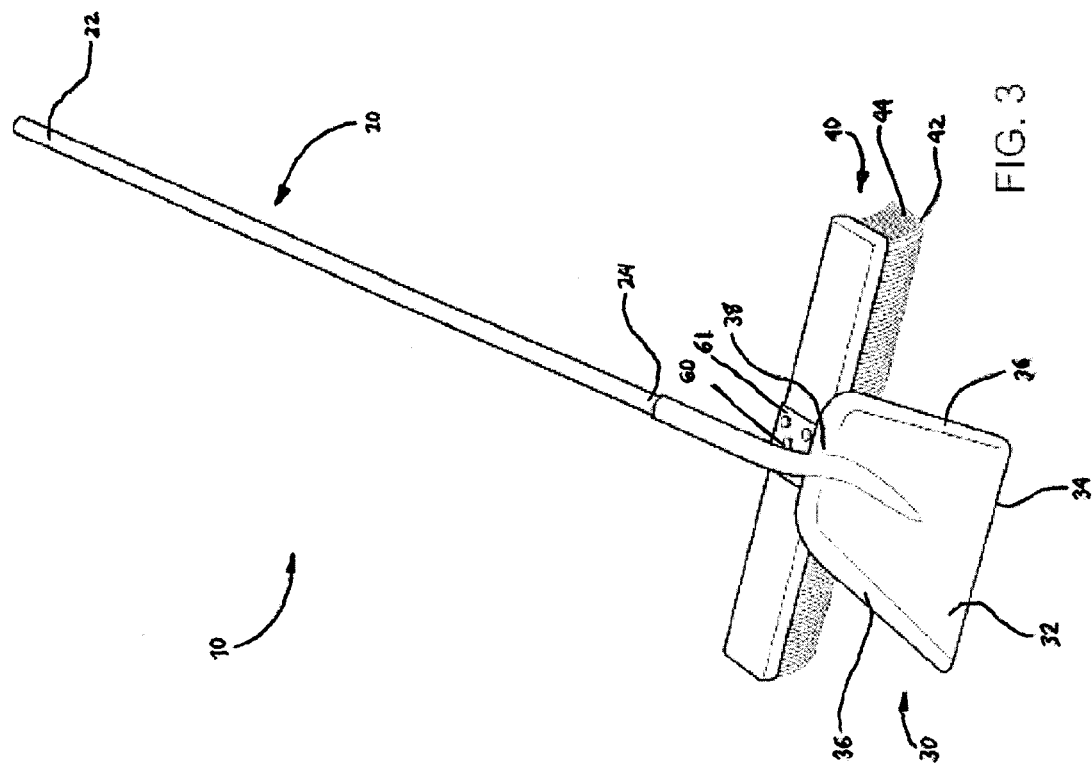
FIG. 3 is a perspective view of one embodiment of the invention.

The extended handle 20 may be made of wood, plastic, fiberglass, metal, or a composite material. Likewise, the shovel portion 30 may be made of plastic, fiberglass, metal, or a composite material. The shovel portion 30 may have a flat leading edge 34 as shown or it may have a spade shaped leading edge and bed (not shown). Likewise, the leading edge 34 may be at an angle relative the handle rather than perpendicular as shown in FIG. 3. The width of the leading edge 34 is expressly contemplated to variable depending on a particular application.

Figure 6:
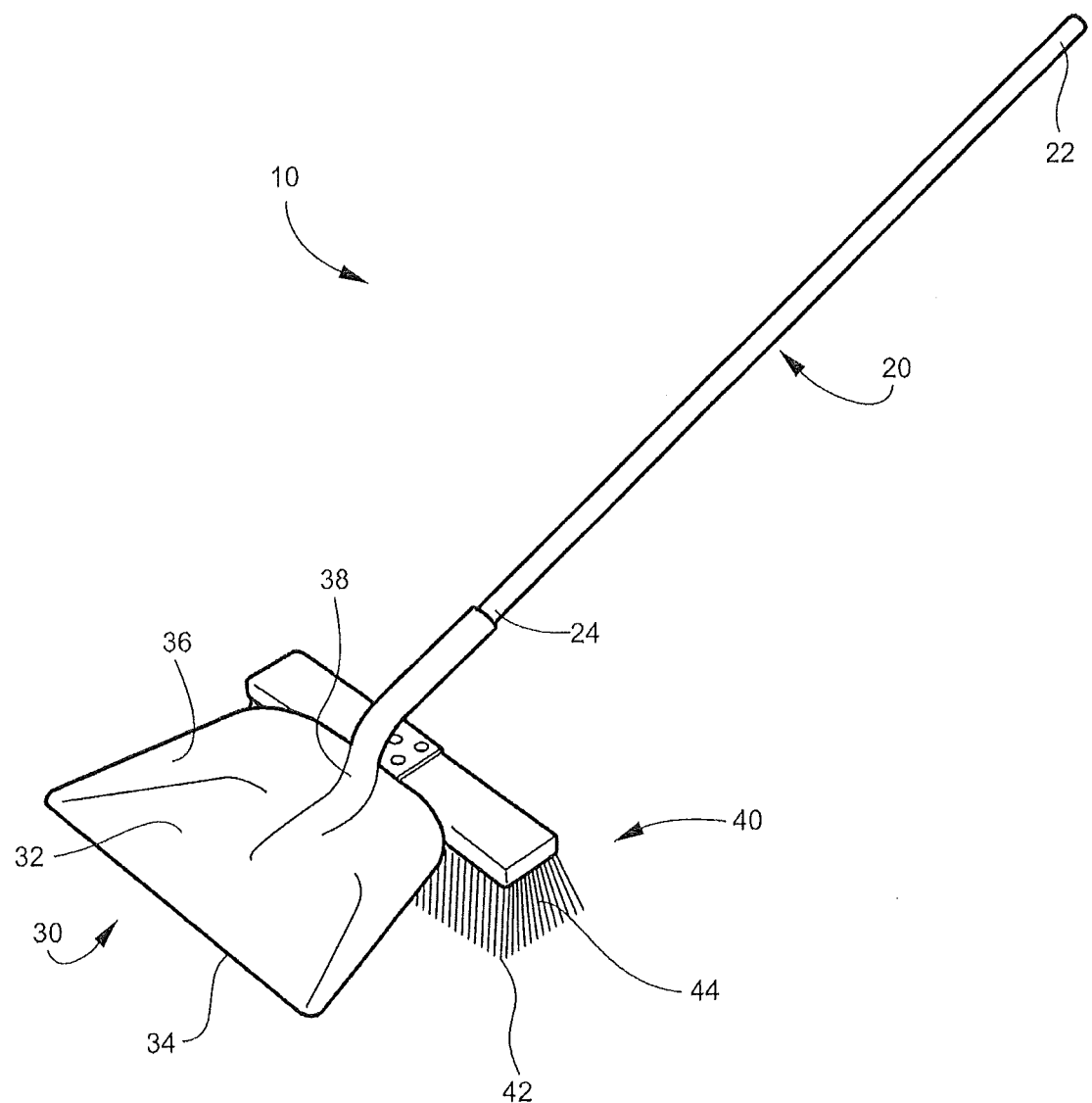
FIG. 6 is a perspective view of one embodiment of the invention.

The broom portion 40 may be made of wood, wood-fiber, plant-fiber, plastic, fiberglass, metal, or a composite material. The bristles 44 may be constructed from a different material from remainder of the broom portion 40. FIG. 3 shows an embodiment of the broom portion utilizing a "push" broom. However, the invention expressly contemplates the use of other forms of brooms as it is known in the art to vary the type of broom head and bristles. Indeed, the invention contemplates use of a mop head in place of a broom head. For instance, the broom portion 40 shown in FIG. 6 shows a push type broom portion that is narrower than the broom portion 40 of FIG. 3. As further shown in FIG. 3, bracket 61 may be formed on a top edge of the back wall of the shovel portion 30 and may receive fastener(s) 60 via threaded engagement thereby attaching the broom portion 40 to the bracket.

A combination broom and shovel 10 according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

What is claimed is:

1. A combination shovel broom comprising:
   a) an elongate handle having a gripping end for gripping the combination shovel broom and an opposing end spaced apart from the gripping end;
   b) a shovel head attached directly to the opposing end of the elongate handle such that the shovel head has an upward sloped angle relative to a longitudinal axis of the elongate handle; and
   c) a broom head directly attached to the shovel head adapted to sweep debris when a longitudinal axis of the shovel head is substantially parallel to a surface beneath the shovel broom, wherein:
   the broom head extends laterally beyond the shovel head and has a plurality of bristles extending away from the shovel head in a perpendicular direction relative to the longitudinal axis of the shovel head;
   the shovel head comprises (i) a shovel bed surrounded by lateral side walls and a back wall that extend upward from the shovel bed and are adapted to trap debris in the shovel head; (ii) a leading edge having a substantially flat shape that is positioned opposite the back wall with the shovel bed positioned there between, and (iii) a curved neck extending from the shovel bed and back wall being directly connected to the elongate handle;
   the broom head is laterally adjacent to the back wall of the shovel head;
   including a bracket formed on a top edge of the back wall and extending laterally away from the back wall in a direction opposite the leading edge, the bracket being attached to the broom head mid-span along the longitudinal axis of the broom head; and
   the bracket and broom head are adapted for a threaded engagement in which the broom head is attached to the bracket by advancing a fastener through the bracket into the broom head.

2. The combination shovel broom of claim 1, wherein the shovel bed is substantially flat.

3. The combination shovel broom of claim 1, wherein an upper surface of the shovel bed is scalloped shaped.

4. The combination shovel broom of claim 1, wherein the shovel head is permanently attached to the elongate handle.

5. The combination shovel broom of claim 4, wherein the plurality of bristles are positioned completely beneath the leading edge of the shovel head relative to the longitudinal axis of the shovel head.

\* \* \* \* \*